United States Patent [19]
Robins et al.

[11] Patent Number: 6,115,744
[45] Date of Patent: Sep. 5, 2000

[54] CLIENT OBJECT API AND GATEWAY TO ENABLE OLTP VIA THE INTERNET

[75] Inventors: Norman Robins; Vincent Lau, both of Sunnyvale, Calif.

[73] Assignee: BEA Systems, Inc., San Jose, Calif.

[21] Appl. No.: 08/688,339

[22] Filed: Jul. 30, 1996

[51] Int. Cl.$^7$ .............................. G06F 13/38; G06F 15/17
[52] U.S. Cl. ........................ 709/227; 709/217; 709/203
[58] Field of Search ........................ 395/200.33, 200.47, 395/200.48, 200.49, 200.57, 200.58, 200.59; 709/203, 217, 218, 219, 227, 228, 229

[56] References Cited

U.S. PATENT DOCUMENTS

| | | | |
|---|---|---|---|
| 5,710,918 | 1/1998 | Lagarde et al. ................. | 395/200.48 |
| 5,742,762 | 4/1998 | Scholl et al. .................... | 395/200.57 |
| 5,774,668 | 6/1998 | Choquier et al. ................ | 395/200.57 |
| 5,790,800 | 8/1998 | Gauvin et al. ................... | 395/200.57 |

OTHER PUBLICATIONS

DCE Encina "Lightweight Client™," *Maximizing resources in the client/server enterprise,* available at Internet site URL, http//www.transarc.com:80/afs/tra. . . .dServ/Product/DE-Light/Itwttex.html (Transarc Corporation, 1996).

DCE Encina "Lightweight Client™ Programmer's Guide and Reference," *Table of Contents,* available at Internet site URL, http://www.transarc.com:80/afs/tra. . .ht/docs/client_prog/prog–root.html (Transarc Corporation, 1996).

Perrochon, Louis, *W3 "Middleware": Notions and Concepts,* available at Internet site URL, http://www.inf.ethz.ch/department/ IS/ea/publications/4www95.html (1995).

Perrochon, Louis, *Translation Servers: Gateways Between Stateless and Stateful Information Systems,* available at Internet site URL, ftp://ftp.inf.ethz.ch/pub/publications/papers/is/ea/nsc94.html (no date given).

Sun Microsystems, *What's Happening. . .:More than a game, this Stateless Interactive Demo is serious fun!,* available at Internet site URL, http://www.sun.com/events/sid/ (no date given).

*Primary Examiner*—Mark H. Rinehart
*Attorney, Agent, or Firm*—Morrison & Foerster

[57] ABSTRACT

An apparatus and method for use in a data processing system to connect a client application with a target service program over a network. An application programming interface presents available services as high-level behaviors to a client application program. A gateway executor on the server performs the detailed interfacing with the target service program, and maintains data about the state of interaction with the application program on the client. Messages passed between the gateway executor and the application programming interface utilize a facilitating protocol, and travel through a communications manager program residing on the client, and through the network. Legacy data systems can provide service across the Internet using some embodiments.

39 Claims, 11 Drawing Sheets

GATEWAY EXECUTOR MESSAGE HEADER

302

| 312 | 313 | 314 | 315 | 316 | 317 | 318 |
|---|---|---|---|---|---|---|
| VERSION | MESSAGE CODE | MESSAGE ID | CID | GEID | RESERVED | CONTENT LENGTH |

*Figure 3(B)*

| MESSAGE CODE NAME | GATEWAY EXECUTOR MESSAGE CODE | MESSAGE CODE DESCRIPTION |
|---|---|---|
| 100 | CT_REQUEST | INDICATES A REQUEST MESSAGE FROM THE CLIENT TO THE BACKEND SERVER. |
| 101 | CT_ACK | INDICATES AN ACKNOWLEDGMENT OF A MESSAGE RECEIVED BY THE CLIENT. |
| 102 | CT_CLOSE | INDICATES AN END OF SESSION FROM THE CLIENT (CLOSE CONNECTION). |
| 200 | BE_REPLY | INDICATES A REPLY MESSAGE FROM THE BACKEND SERVER TO THE CLIENT. |
| 201 | BE_ACK | INDICATES AN ACKNOWLEDGMENT OF A MESSAGE RECEIVED BY THE BACKEND. |
| 203 | BE_ERROR | INDICATES AN ERROR RESPONSE FROM THE BACKEND SERVER TO THE CLIENT. |

*Figure 3(C)*

| 341 | 342 | 343 | 344 | 345 |
|---|---|---|---|---|
| CODE | OPERATION NAME | OPERATION CLASS | CLIENT ORIGINATION PARAMETERS | GATEWAY EXECUTOR ORIGINATION PARAMETERS |
| 100 | T_BEGIN | TRANSACTION | TIMEOUT | XID AND ERRNO |
| 101 | T_COMMIT | TRANSACTION | XID | ERRNO |
| 102 | T_ROLLBACK | TRANSACTION | XID | ERRNO |
| 103 | T_SUSPEND | TRANSACTION | XID | ERRNO |
| 104 | T_RESUME | TRANSACTION | XID | ERRNO |
| 105 | T_GETINFO | TRANSACTION | XID | ERRNO AND TXSTATE |
| 200 | S_CALL | SERVICE | NAME, VERSION, DATA, FLAGS | DATA, ERRNO, CLIENTDATA |
| 201 | S_ENQUEUE | SERVICE | NAME, VERSION, DATA, FLAGS, CORRID | MSGID, ERRNO |
| 202 | S_DEQUEUE | SERVICE | NAME, VERSION, CORRID, MSGID, FLAGS | DATA, ERRNO, CLIENTDATA |
| 203 | S_CONNECT | SERVICE | NAME, VERSION, DATA | CID, ERRNO |
| 204 | S_SEND | SERVICE | CID, DATA, FLAGS | ERRNO |
| 205 | S_RECV | SERVICE | CID, FLAGS | DATA, ERRNO, EVENT, CLIENTDATA |
| 206 | S_DISCONNECT | SERVICE | CID | ERRNO |
| 207 | S_EVENTPOSTING | SERVICE | NAME, VERSION, DATA, FLAGS | ERRNO, NUMPOSTINGS |
| 300 | N_SUBSCRIBE | NOTIFICATION | EVENT, DATA | NID, ERRNO |
| 301 | N_UNSUBSCRIBE | NOTIFICATION | NID | ERRNO |
| 302 | N_NOTIFY | NOTIFICATION | NID | DATA, FLAGS |
| 303 | N_POLLEVENT | NOTIFICATION | | NID |
| 400 | L_GETCONFIG | LOGON | JOLTVERS | AUTHLEVEL, TUXVERS, JOLTVERS, ERRNO |
| 401 | L_LOGON | LOGON | JOLTVERS, USERNAME, USERROLE, DATA, PASSWD, APPASSWD, GROUPNM | ERRNO |
| 402 | L_LOGOFF | LOGON | | ERRNO |
| 500 | R_GETNUMRECS | REPOSITORY | REPOSITORY_NAME, | NRECS, ERRNO |
| 501 | R_GETNAMES | REPOSITORY | REPOSITORY_NAME, NRECS | NRECS, NAME, ERRNO |
| 502 | R_GETDEF | REPOSITORY | REPOSITORY_NAME, NAME | DATA, ERRNO |
| 503 | R_GETALL | REPOSITORY | REPOSITORY_NAME, ERRNO, NRECS, DATA | |
| 504 | R_SETDEF | REPOSITORY | REPOSITORY_NAME, NAME, DATA | ERRNO |
| 505 | R_GETKEYS | REPOSITORY | REPOSITORY_NAME, NRECS | NRECS, KEY, KEYVAL, ERRNO |
| 506 | R_GETKEYDEF | REPOSITORY | REPOSITORY_NAME, KEY, KeyVal | DATA, ERRNO |
| 507 | R_SETKEYDEF | REPOSITORY | REPOSITORY_NAME, KEY, KeyVal, DATA | ERRNO |

*Figure 3(E)*

CLIENT OBJECT API AND GATEWAY TO ENABLE OLTP VIA THE INTERNET

The present invention provides an apparatus and method in a data processing system for connecting a client program with a server program across a network.

BACKGROUND OF THE INVENTION

Over the years of computerized data processing, commercial enterprises have built large legacy databases on central computers. Desktop PCs connected via LANs, rather than dumb terminals with direct connections, have become the means of accessing these databases. Furthermore, in on-line transaction processing systems, PCs have taken on a role in the actual processing of a transaction, creating a distributed computing environment (DCE). Transaction processing monitor (TPM) programs running on central computers have also been expanded to operate in the DCE. TPMs which formerly communicated keyboard input and display output data streams, have been expanded to communicate service requests and replies. Other "server" programs have been created specifically for the DCE which communicate only service requests and replies. The standard of DCE computing has become the client-server model.

In client-server computing there is interaction between two computers usually connected by a local area network, or LAN. The first computer, the client, requests a data processing operation be performed on the second computer, or server, as a step in achieving its particular objective. For example, because legacy databases are often centralized on a medium or large scale computer, these computers often act as database servers, adding, changing, or deleting database information in response to a request from a client PC.

Server programs commonly make their services available to the client program through a remote procedure call (RPC) mechanism. The client program typically makes many procedure calls during its execution. These procedures execute on the same computer as the client program. Each procedure generally performs a small, discrete data processing operation. When a remote procedure call is made, a request to perform the procedure is transmitted across the LAN to the server computer, where the procedure is executed and some result is returned to the client.

Users too geographically distant to be directly attached to the LAN typically need to make a dial-up connection over a phone line and attach to the LAN or the server itself in order to run programs written for the DCE. Because of the limited bandwidth of switched telephone lines, this usually means a great sacrifice in speed. In many applications the speed problem is severe enough to preclude dial-up usage altogether.

At the same time that the number of LANs and client-server DCEs was rapidly expanding, so was the Internet. LANs were being interconnected into private wide area networks, or WANs. These private WANs were in turn being connected into the global WAN known as the Internet. Some private WANs are constructed using the technology base of the Internet, forming what are called intranets.

The fastest growing portion of the Internet is what is known as the World Wide Web ("WWW", or "Web", for short). The Web is built on the client-server model. Web browsers are the client programs. These browsers take a document formatted in HTML, generate its visual display, and perform any associated processing. Web servers, deliver an HTML document, or "Web page," to a Web browser when requested. With all existing Web browsers, the interaction is stateless, meaning that a Web server retains no information about a particular client with which to influence any future interactions with that client.

Gaining access to the Web is often a primary motivation behind efforts to build intranets and to get private WANs connected to the Internet. Once connected, the computer user has a high-speed connection to the world, but ironically that high speed connection most often cannot be used to connect a geographically remote user to a company server for transaction processing.

There are two main reasons why the Internet has not been used to support traditional on-line transaction processing. First, the TPM employed cannot communicate using the protocols of the Internet. Second, client applications are written dependent on operating characteristics of the LAN not shared by the Internet.

Several differences between a LAN and the Internet make TPMs suitable for LANs difficult to use with the Internet. Unlike LANs, the Internet covers an immense geography, and potentially long distances can result in slow response times. The Internet instantaneously constructs a virtual circuit for each communication with varying reliability outside the control of the user, while LANs are generally more reliable. The public nature of the Internet introduces privacy and security concerns not as relevant to LANs. Lastly, some Internet protocols are stateless and unusable for "stateful" transaction processing.

Despite these obstacles, transaction processing across the Internet has been successfully accomplished. One implementation is a "translation server" (see Perrochon, "Translation Servers: Gateways Between Stateless and Stateful Information Systems"). Translation servers are, however, directed at the "TPM to dumb terminal" model of on-line transaction processing. The translation server essentially translates the dumb-terminal display format information into HTML format for display on a Web browser. The translation server also translates user input from the browser into keyboard input for the TPM.

Another implementation of transaction processing across the Internet is an RPC gateway. This implementation is directed at the client-server model. DCE Encina Lightweight Client(TM) from Transarc Corporation is a commercial example of this methodology. In it, the gateway processor acts as an intermediary, accepting RPC requests from the client over the Internet connection. The gateway processor then forwards the request to the server application via a communication channel, protocol, and format natively acceptable to the server application. Responses from the server to the client similarly travel back through the gateway processor. Multiple, alternate gateway processors can be deployed to improve reliability.

The RPC gateway model has several disadvantages. For example, the cost of a separate gateway processor may be prohibitive if required. In addition, the potentially long response time of the Internet compared to a LAN can slow the application unacceptably. Applications which issue multiple RPCs per transaction are especially susceptible. Accordingly, while RPC gateways allow TPMs to be used on the Internet, many of the advantages TPMs bring to networks cannot be achieved using the RPC gateway model.

Consequently, being able to connect a client program with a server program across the Internet or a similar network in a way that allows for the advantages of TPMs to be utilized on the Internet would be a significant advance over existing systems.

Thus several objects of the present invention include:

allowing legacy on-line transaction processing systems to exploit Internet-like networks for client-server computing.

minimizing the network traffic required to complete the server processing for a transaction.

providing sophisticated use of network connections by servicing multiple clients from an individual server port.

maintaining essential data about the client application state in a controlled environment on the server rather than on the client processor or in the protocol.

increasing the reliability and recoverability of a transaction processing system operating over an unreliable network.

providing a general purpose, high-level interface between client applications and server-based services which hides the complexity of using the service from the client application.

improving the scalability of server support for clients connected via Internet-like networks.

enabling deployment of client application programs which utilize commonplace Web browsers for their user interface.

The present invention provides these advantages of bringing TPMs to the Internet, and thus provides significant advantages over existing systems.

SUMMARY OF THE INVENTION

The present invention provides an apparatus and method in a data processing system for connecting a client program with a server program across a network. One embodiment of the invention includes a gateway executor program running on the server computer which is able to conduct service request transactions with a target service program. An application programming interface running on the client computer abstracts the complex technical particulars of conducting service request transactions to a level focusing on the desired result, and presents available service request types as behaviors to a client application program. The application programming interface talks to the gateway executor program through a communications manager on the client, interfacing to the network. Messages passed among the gateway executor, the applications programming interface, and the client communications manager utilize a gateway executor protocol to achieve coordination and cooperation. Data regarding the state of interactions between the client and the server are maintained in a controlled fashion on the server to improve recovery and reliability. The embodiment permits legacy on-line transaction processing systems to operate effectively over relatively unreliable wide area networks such as the Internet.

These and other objects and advantages of the invention will become apparent to one of ordinary skill in the art upon consideration of the following Detailed Description and the Drawings.

BRIEF DESCRIPTION OF THE DRAWINGS

The novel features of the invention are set forth in the appended claims. However, for purpose of explanation, several embodiments of the invention are described by reference to the following figures.

FIGS. 3(A)–(E) present illustrations of gateway executor protocol elements.

DETAILED DESCRIPTION OF THE INVENTION

The present invention provides an apparatus and method in a data processing system for connecting a client program with a server program across a network. In the following description, numerous details are set forth for purpose of explanation. However, one of ordinary skill in the art would realize that the invention may be practiced without the use of these specific details.

In other instances, well-known structures, devices and methods are shown in block diagram form or summarily described in order not to obscure the description of the invention with unnecessary detail. This is notably true regarding means employed in modem-day computer systems for inter-process communication, inter-component transfer of data and processing control, inter-component connection, and program interfacing to a physical network through layered service routines often part of the operating system.

Figure 1:
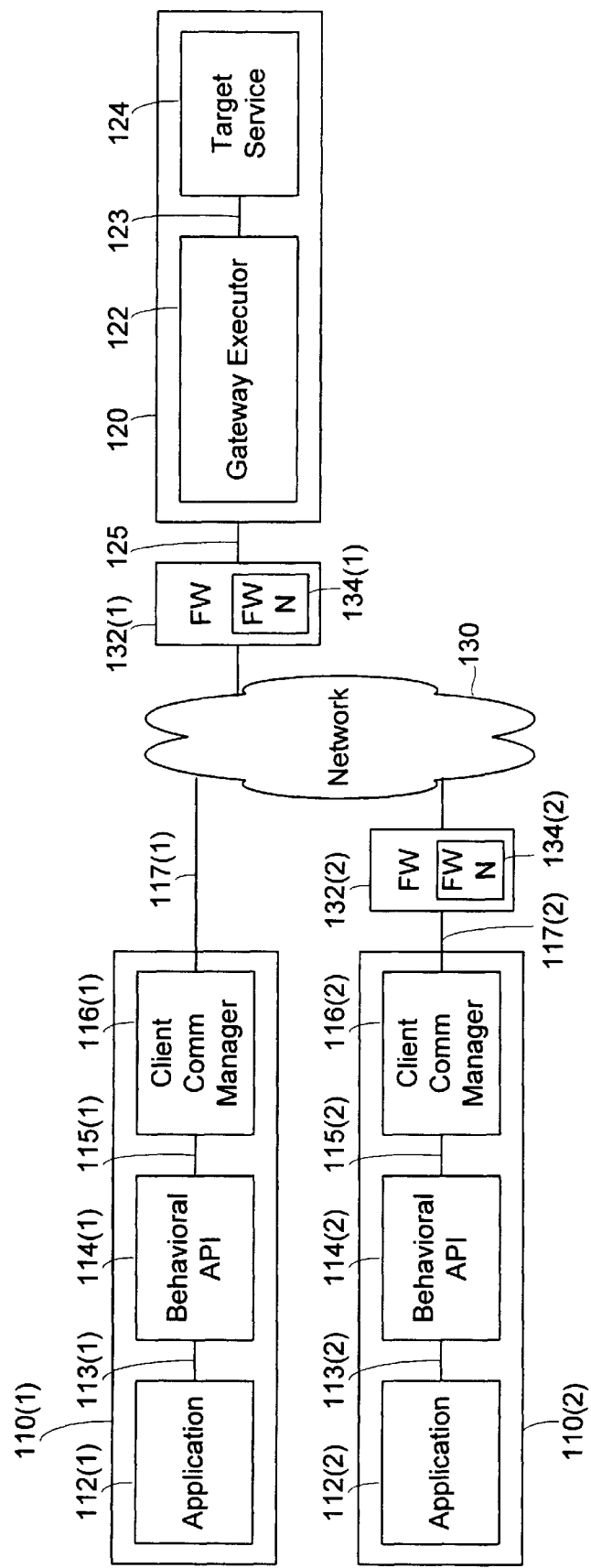
FIG. 1 presents a block diagram of the invention as used in a data processing system.

FIG. 1 sets forth one embodiment of the invention as used in a data processing system 101. The system includes one or more client processors 110 and a server processor 120. Each client processor 110 is able to communicate bidirectionally with the server processor 120 over a wide-area data communications network 130 (WAN).

In certain instances, especially where the WAN employed is the Internet, the network path from the client processor 110(2) to the server processor 120 may include one or more firewalls 132 which filter out unauthorized or unnecessary network traffic. If this is the case, and the firewalls 132 obstruct the passage of network messages used by an embodiment to practice the invention, then firewall negotiators 134 may be installed to allow such network messages to traverse the entire network path from the client processor 110(2) to the server processor 120. Firewalls and firewall negotiation are well known in the art.

Each client processor 110 hosts a client application 112, an application programming interface 114 (API), a client communication manager 116 (CCM), a connection 113 between the client application 112 and the API 114, a connection 115 between the API 114 and the CCM 116, and an attachment 117 to the network 130.

The server processor 120 hosts a gateway executor program 122, a target service program 124, a connection 123 between them, and an attachment 125 to the network 130.

The client application program 112 executing on the client processor 110 is written for a distributed computing environment (DCE). As such, it relies to some extent on services provided by the target service program 124 executing on the server processor 120 to perform its function. To connect with the target service program 124, the client application 112 communicates with the application programming interface 114. The client application 112 invokes behaviors presented to it by the API 114 and receives certain resulting responses via the API 114.

The API 114 communicates with the client communication manager 116 (CCM) to send and receive messages across the network 130 to the gateway executor 122. In some embodiments the connection 115 between the API 114 and the CCM 116 may be an active one, including processes guaranteeing the ACID properties of a transaction conducted using the invention. The ACID properties are atomicity, consistency, isolation, and durability, and are well known in the art. The CCM 116 is attached to the network.

The gateway executor 122 executes on the server processor 120 and is attached to the network 130 to receive and process messages directed to it by one or more CCMs 116. In response to a received message, the gateway executor 122 can direct messages to a respective CCM 116. In one embodiment of the invention, it is the client processors 110 that originate communication with the server processors 120, and not vice versa. Any message directed from a gateway executor 122 to a CCM 116 is in response to some earlier message directed from the CCM 116.

Based on the content of messages directed to the gateway executor 122 by the CCMs 116, the gateway executor 122 communicates with the target service program 124 on behalf of the client application 112 to request the performance of services and to receive replies thereto. The gateway executor 122 may take a single request originating from the client application 112 and from it generate multiple requests to the target service program 124. Because each request to the target service program 124 is actually a request-reply combination, and because the multiplicity of requests to the target service program 124 are generated on the server processor 120 rather than on the client processor 110, network traffic may be greatly reduced which is an advantage of the present invention.

Figure 4:
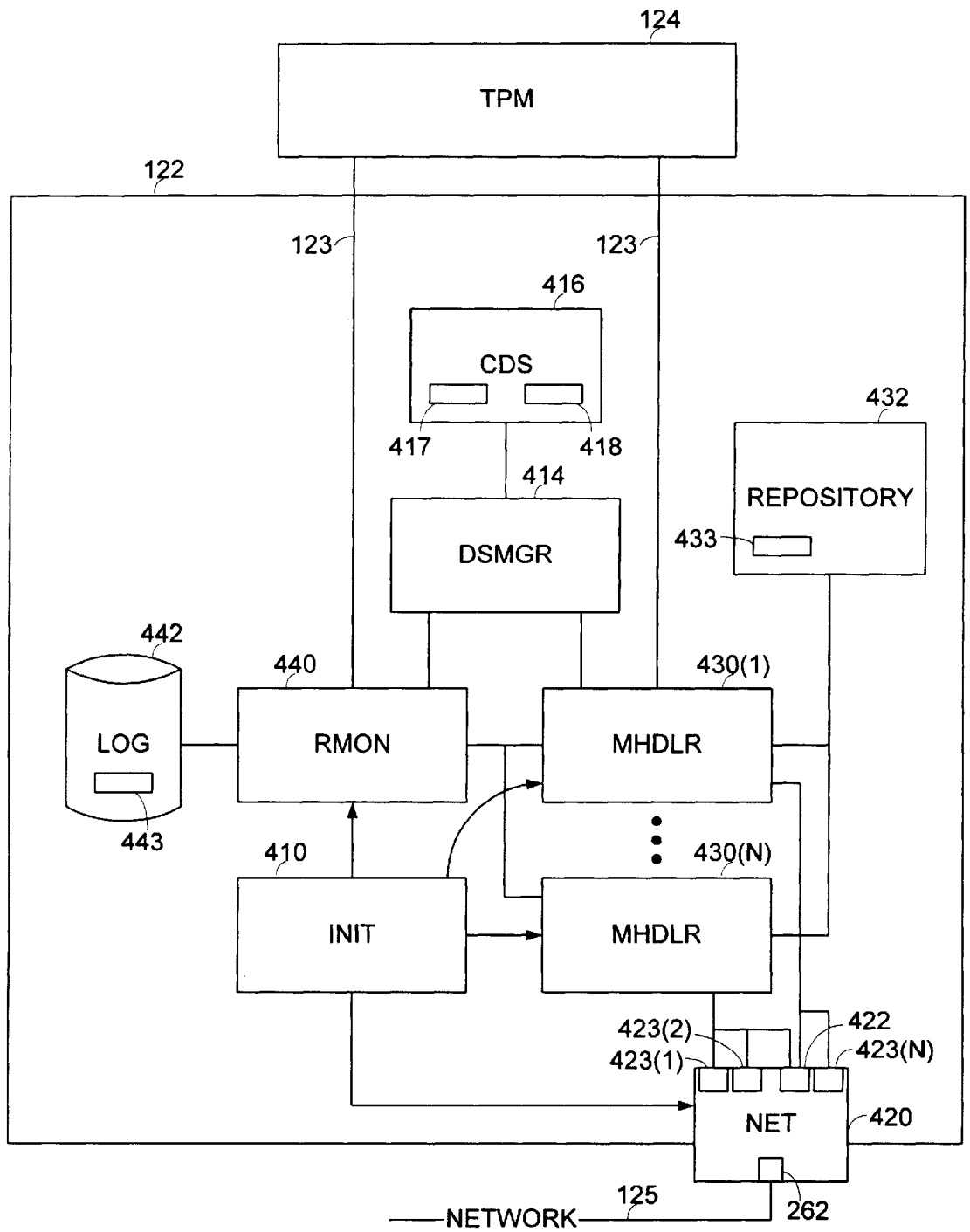
FIG. 4 presents a block diagram of a gateway executor.

In order to service the requests from multiple client processors 110, the gateway executor 122 also functions to maintain the operating context for each client with an active connection, a pending request, or a pending reply. The maintenance of the client contexts, discussed in more detail below in reference to FIG. 4, provides two further advantages of the invention. It reduces the coding complexity required of the client application, and it provides potential for improved recoverability in the event of a failure occurring mid-transaction.

Thus an API 114, a CCM 116, a gateway executor 122, and the connections between them including a WAN 130 form a bidirectional active channel between a client application 112 and a target service program 124. The API 114, CCM 116, and gateway executor 122 facilitate their end-to-end communication using an application level protocol referred to as the gateway executor protocol, as will be discussed in connection with FIGS. 3(A)–(E). The gateway executor protocol inheres in the formatted data structures, and the data values having ascribed meanings placed within those structures, necessarily exchanged between and among the API 114, CCM 116, and the gateway executor 122.

EMBODIMENT OVERVIEW

Figure 2:
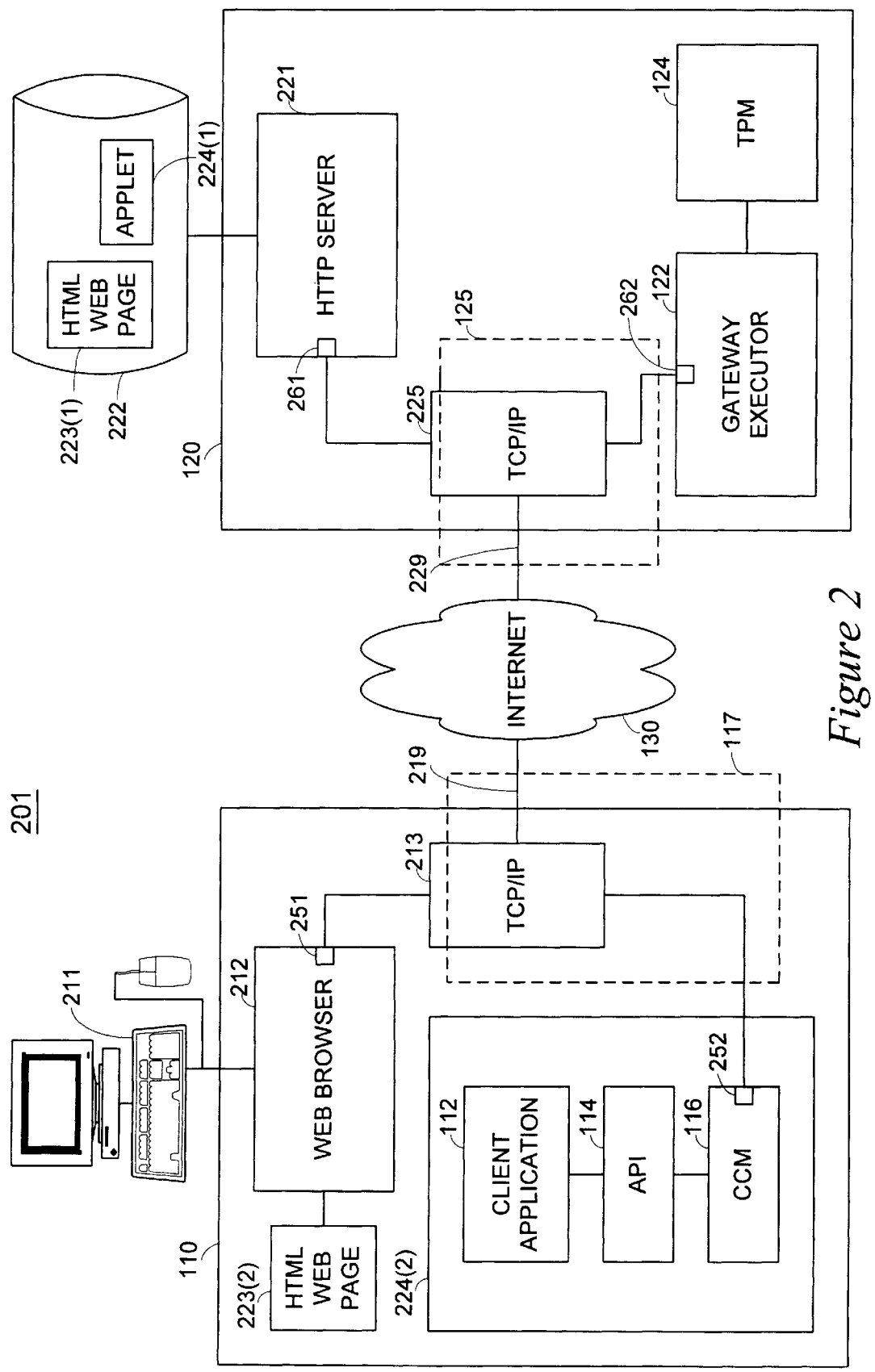
FIG. 2 presents an illustration of the operating environment in one embodiment.

FIG. 2 illustrates the operating environment 201 for one embodiment of the present invention, planned to be delivered in a future commercial offering named JOLT(TM) from BEA Systems, Inc.

The server processor 120 hosts a TCP/IP protocol network interface 225, a network attachment 229, a gateway executor 122, a target service program 124, an HTTP server 221, and a storage medium 222. The storage medium 222 contains a Web page 223(1) and an associated applet 224(1).

The client processor 110 attaches input/output devices 211 and hosts a TCP/IP protocol network interface 213, a network attachment 213, a Web browser 212, a copy of the Web page 223(2), and a copy of the applet 224(2). The applet 224 contain a client application 112, an API 114, and a CCM 116. The client processor 110 and the server processor 120 are connected by the Internet 130.

The server processor 120 in this example is a computer capable of running UNIX(TM), though other operating systems may be used. The gateway executor 122 executes on the server processor 120. Also, other programs execute on the server processor 120, these programs being known in the art. The target service program 124 is a commercially available transaction processing monitor (TPM), named TUXEDO(TM). An HTTP server program 221, widely referred to as a "Web server", is also known in the art.

The Internet WAN 130 in this embodiment is TCP/IP based. Practitioners in the art recognize that many other WAN embodiments are possible. These would include, for example, private intranets, or the use of UDP/IP over the Internet or an intranet.

The client processor 110 is a modem desktop computer having an Internet connection 219, TCP/IP software 213, and a Web browser 212 supporting JAVA(TM).

It is noted that in this embodiment certain components are loaded into the client processor 110 as the result of the computer user instructing the Web browser 212 via the input/output devices 211 to retrieve a particular Web page 223(1). The Web browser 212 issues the request to the HTTP server application 221 and in turn receives the Web page 223(2) and a JAVA(TM) applet 224(2) associated with the page. The Web browser 212 generates a display of the Web page 223(2) for the client processor user and enables the applet 224(2). The applet 224(2) contains client application 112, API 114, and CCM 116 program code. With or without further action by the user, the client application 112 code begins execution. The invention can be as easily practiced in embodiments where any or all of the client application 112, API 114, and CCM 116 are firmly resident at the client processor 110, i.e., not transferred from the server processor 120.

It is further noted that the connections between the Web browser 212 and the the HTTP server application 221, and between the client application 112 and the target service program 124, are logically isolated. They use the same physical network connections 219, 229 on each of the client processor 110 and the server processor 120 but different TCP/IP ports 251, 252; 261, 262. Moreover, because of the HTTP protocol used on the Web portion of the Internet, during operation there will likely be no active connection between the Web browser 212 and the HTTP server application 221 during times when the client application 112 is requesting services of the target service program 124.

It is further noted that an embodiment of the gateway executor protocol as used in this detailed description is illustrated in FIGS. 3(A) through 3(E). The various elements so illustrated are discussed at various points throughout the detailed description to facilitate an understanding of the invention.

GATEWAY EXECUTOR STRUCTURE AND INITIALIZATION

The gateway executor 122 is also executing on the server processor 120. FIG. 4 illustrates the gateway executor in its initialized state. The gateway executor 122 comprises a context data store 416, a data store manager 417, a repository 432, a reply monitor 440, one or more message handlers 430, a log file 442, an initialization module 410, and a network connection 420.

The log file 442 contains zero or more log entries 443. The repository 432 contains one or more repository entries 433. The context data store 416 contains zero or more client context entries 417 and zero or more pending request entries 418.

The operating environment of the gateway executor also includes an attachment to the network 125 and the operating TPM 124.

The network connection 420 uses the TCP/IP protocol and comprises a single port 262, a listening socket 422, and one or more CCM sockets 423. The port 262 multiplexes the communications for all client applications connecting with the gateway executor. Such multiplexing is an efficient use of computing and network resources and represents a further advantage of the invention.

When the gateway executor 122 is first started, an initialization module 410, INIT, receives control. It establishes the network connection 420 by opening a TCP/IP listening socket 422 using a port address specified by a startup parameter.

The INIT module 410 further spawns one or more message handler 430 processes. The number spawned is determined by a start-up parameter. The INIT module 410 further spawns a reply monitor process 440. Together, the reply monitor 440 and the message handlers 430 perform the bulk of the ongoing work of the gateway executor 122 and are described now in more detail.

MESSAGE HANDLERS

Message handlers 430 handle inbound and outbound network traffic for the gateway executor 122 and initiate service request processing. To perform its functions a message handler 430 accesses network messages via the network connection 420, a context data store 416 via a data store manager 414, the target service program 124 via procedure calls, and a repository 432.

One possible format of a repository entry 433 is described in the source code depicted in Table 1. Each repository entry 433 identifies a service type available from the target service program 124 and describes one or more parameters associated with it. Parameter descriptions may include a name, data type, length, and direction, i.e., whether the parameter is used for input or output.

TABLE 1

```
Service Def {
    char qName[];
    int timeOut;
    char name[];
    int number of parameters;
    char ** paramptr;
    int inBufType;
    int outBufType;
    char inBufName[];
    char outBufName[];
};
```

Figure 5:
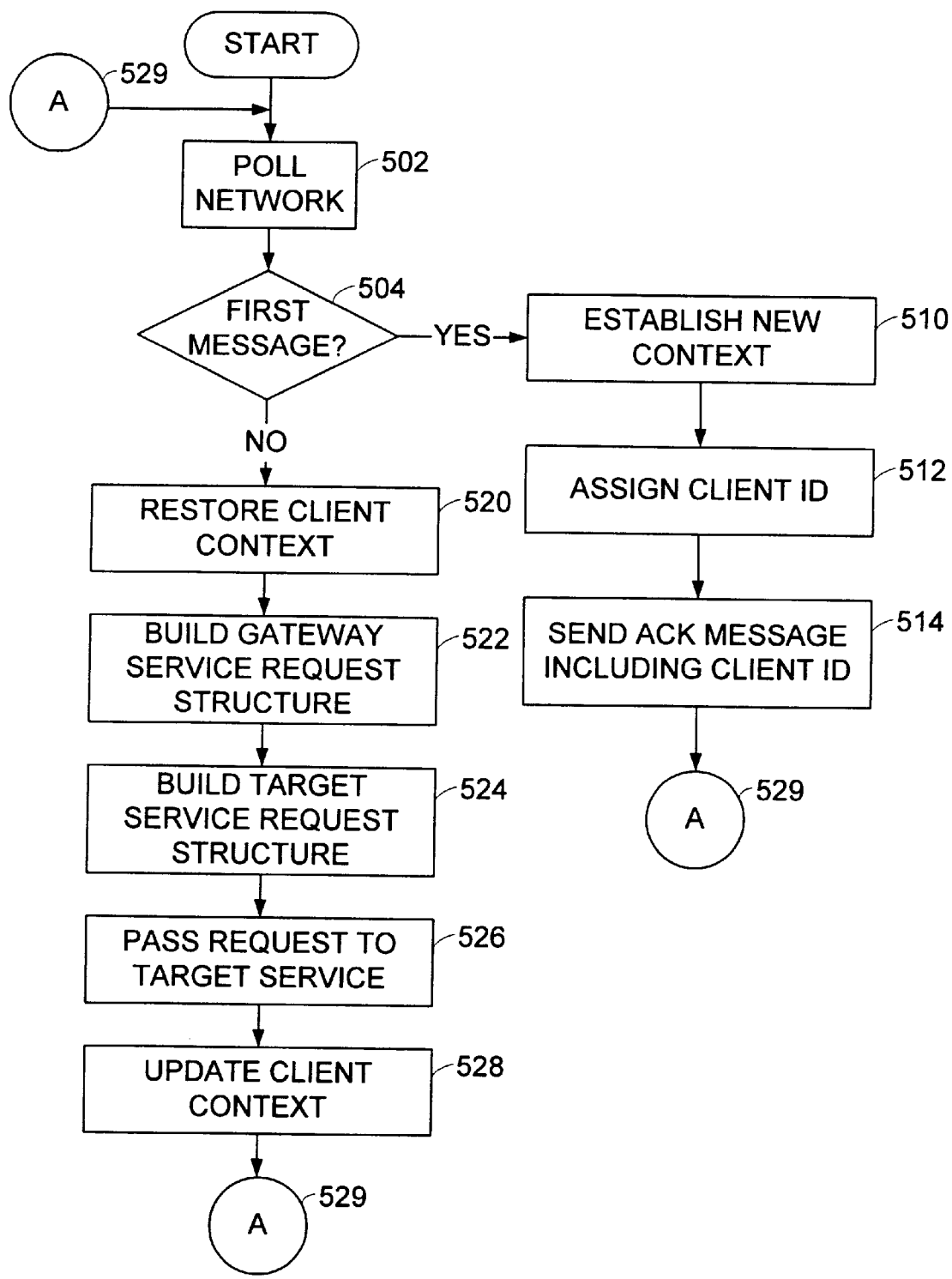
FIG. 5 presents a flowchart of message handler processing.

FIG. 5 shows a flowchart of the main processing loop for one embodiment of a message handler 430 suitable for the purposes of the present invention. When started the message handler, in step 502, polls the network connection 420 to determine if there is a new incoming message for it. It will first process messages from client applications with which it already has an established connection. Each such established connection has a one-to-one correspondence with a CCM socket 423 in the network connection 420. Each message handler 430 can concurrently support multiple client applications to a maximum number specified in a startup parameter.

In step 504, if there is no new message from an established connection, and if the message handler is not already supporting its maximum number of client applications, then the message handler will process a first incoming message from a client application not yet associated with any message handler. Such messages arrive on the listening socket 422 shared by all message handlers 430.

The first message from a client application not associated with any message handler is identified by a null value in the CID field of the message header and is processed as follows. In step 510, a procedure call is made to the target service program 124 to establish a new client context.

In step 512, a unique client ID (CID) is generated and recorded in the context data store 416 along with the target service program context and other identifying information. The CID takes the form of a serial number and is generated by the message handler. Each CID generated is unique within an execution lifetime of the gateway executor 122. A client context entry 417 in the context data store 416 contains the CID and references to target service program internal data structures which are used for the purpose of managing transactional states of each concurrent client. One possible format for a client context entry 417 is described in the source code depicted in Table 2.

TABLE 2

```
struct beClt {
    int state;
    long clientId;
    long flags;
    long clientTimeOut;
    long sessionKey;
    long blockTime;
    TMCLTCNTXT beCltCntxt;
    long requestCount;
    request_t rqstInfo[BEMAXCLTREQ];
};
```

In step 514, the generated CID is sent back to the client application in the message header of a reply message. At this point, the client application has an established connection. In step 516, the message handler returns to network polling.

New messages arriving across the network from client applications with established connections are processed by the message handler as follows.

In step 520, the CID from the control header is used to retrieve the client context entry 417 from the context data store. Information from the client context entry 417 is used to process the request.

The message handler then translates parameter data as necessary from client application to server-dependent forms and formats it into a service request structure, in step 522. One possible format for a service request structure is described in the source code depicted in Table 3.

TABLE 3

```
struct Service[
    char qName[];
    int timeOut;
    char name[];
    int opCode;
    int number of parameters;
    char ** paramptr;
    int inBufType;
    int outBufType;
    char inBufName[];
    char outBufName[];
    int msgHandle;
    char corrId[32];
    int jot1Error;
    char errMsg[];
}
```

In step 524, request information is taken from the service request structure, and placed into a target service program-specific request buffer format. The message handler then sends the request buffer to the target service program 124, in step 526, via a procedure call.

It is noted here that the target service program-specific buffer could be built immediately without the intermediate service request structure. This two-step translation process is employed in this embodiment, however, to ease portability to different target service programs and different server processors. The invention is not limited to a two-step translation process.

Information regarding the pending request is posted to the context data store 416 using the context data store manager 414. One possible format for a pending request entry 518 is described in the source code depicted in Table 4.

TABLE 4

```
struct request {
    long flags;
    long msgId;
    union {
        int handle;
        struct qElement q;
    } msgHandle;
}
```

At this point, the message handler is complete with the processing of this inbound message and returns to network polling in step 529.

REPLY MONITOR

The reply monitor 440 monitors the status of pending target service program requests, generates reply messages to the client application, and maintains recoverability data in log entries. To perform its functions the reply monitor 440 accesses the context data store 416 via the context data store manager 414, a log file 442 containing recoverability data, the target service program 124 via procedure calls, and the message handlers 430 to send the reply messages it generates.

Figure 6:
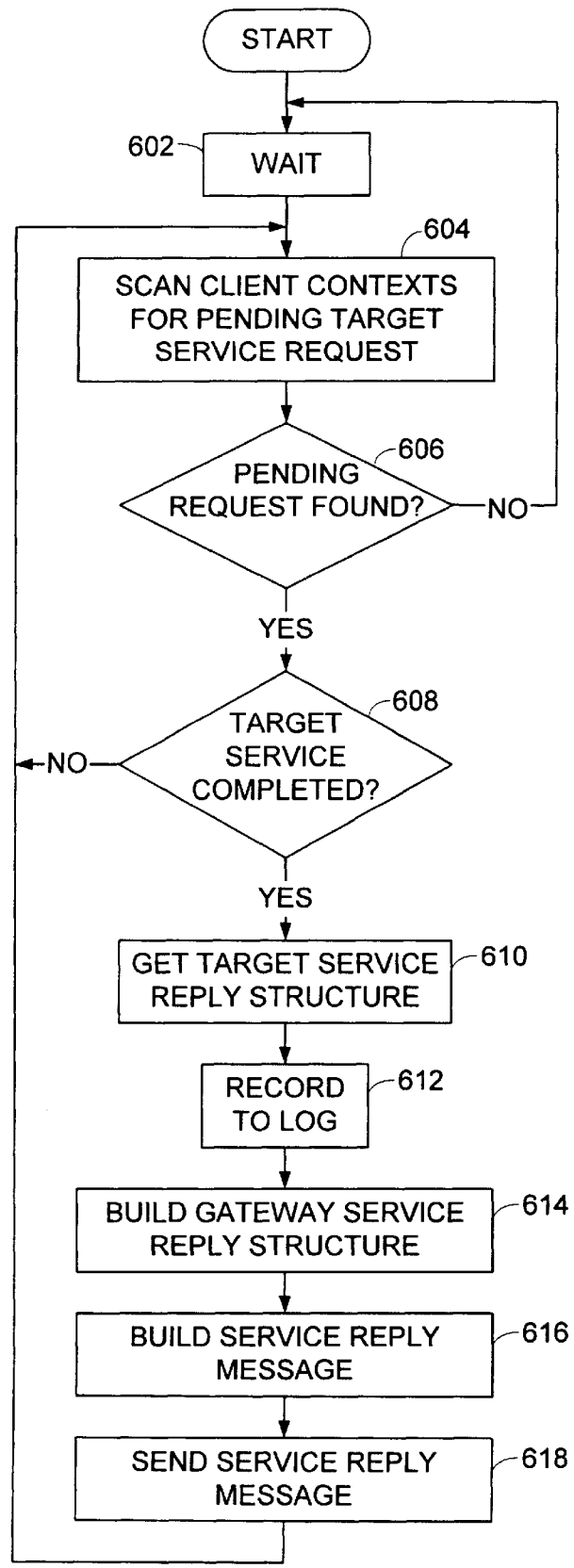
FIG. 6 presents a flowchart of reply monitor processing.

FIG. 6 shows a flowchart of the main processing loop for one embodiment of a reply monitor 440. During operation, in step 604, the reply monitor periodically performs a scan of pending requests posted in the context data store 416. It accesses pending request entries 418 using the context data store manager 414. In step 606, if there are no pending requests, the reply monitor idles for a short period in step 602 and tries again. If a request is found, the reply monitor uses information from the pending request entry 418 to format a request to the target service program 124 for status. In step 608, if the requested service is completed, reply monitor 440 takes the reply from the target service program 124 in step 610, and records it to a log file 442 in step 612 as a formatted log entry 443.

It should be noted that the log file 442 could be maintained in non-volatile storage. In such a case, the log file information may be used for recovery and is most useful if it survives a failure on the server processor.

A service request structure is built from the target service program-formatted buffer in step 614, and a reply service message properly formatted for the client application is built from the service request structure in step 616.

In step 618, the reply monitor 440 uses information available in the context data store 416 to determine which message handler 430 maintains the connection with the client application 112 initiating the finished request, and forwards the reply service message to that message handler. The message handler 430 formats the reply service message according to the relevant gateway executor protocol elements and forwards it over the network connection 420 for transmission to the client processor 110, completing the task on behalf of the reply monitor 440.

Regarding the use of the log file 442 for recovery, it should be noted that recovery can occur at two levels. There can be recovery in the event of an application level failure. In other words, the client application fails, the gateway executor fails, or both fail before all messages expected in reply to an earlier request are received by the client. One embodiment able to support recovery at this level includes having the gateway executor generating a session identifier (SID) unique across its many executions for each such round of communication. The SID may then be communicated to the client application and stored durably by both the client application and the gateway executor. Both would also include functionality for recovery handshaking in such an embodiment.

Recovery can also occur in the event of a network level failure. In other words, the client application and the gateway executor continue to function normally, but the connection between them drops out. One embodiment supporting this level of recovery could do so through the use of the gateway executor identifier (GEID) and the CID, both of which are already included in the gateway executor protocol.

It should be noted that recovery in the event of network failure is first considered in terms of unintended loss of connections. This same "recovery" could be deliberately employed to create a "connectionless" mode of operation, if desired, where the virtual circuit between a CCM and the gateway executor is transient, existing only for the discrete durations of single transmissions or single request-reply cycles.

To summarize, the gateway executor 122 running on the server processor 120 has message handlers 430 to perform communication with client applications and to initiate requested services with the target service program 124. The gateway executor also has a reply monitor 440 to identify requests completed by the target service program 124 and to generate reply messages back to the client application. The gateway executor 122 thus forms the server processor side of the bidirectional active channel between a client application and a target service program. The API and CCM which form the client processor side of the bidirectional active channel will now be described in more detail.

THE API

Referring again to FIG. 2, the API 114 connects the client application to the CCM 116. On the client application side, the API 114 exposes a number of predefined behaviors to the client application 112. Requesting a behavior is how the client application communicates to the API. Replying to a behavior request is how the API communicates to the client application.

Behaviors most often are defined in terms of specific end results desired from target service program 124 processing, but can also be directed toward gateway executor 122 processing. Behaviors are often directly related to services implemented under the target service program 124.

In a banking application, for example, Withdrawal and Deposit are representative services, each which may perform substantial processing. Such processing may include account number validation, account status validation, fund availability checking, new balance calculation and update, and a posting operation.

The Withdrawal and Deposit services implemented under the banking target service program are each represented in the gateway executor by a repository entry. The API, after requesting and receiving the respective repository entries, and based on information contained therein, presents Withdrawal and Deposit behaviors to the client application. Using the behaviors, the client application needs only to include program code to set parameters, request service execution, and check results. Table 5 shows an example of possible source code for a client application using an embodiment of a behavioral API to request the target service program's Withdrawal service.

The high-level view of the service request process available to the client application is made possible because the API 114 and the gateway executor 122, in concert, perform the detailed particulars. This involves tedious buffer formatting and management, status checking, and one or more procedure calls to the target service program. The API thus presents an abstracted view of the service request process requirements to the client application.

It is noted that the abstraction provided by the API represents further advantages of the present invention. The programming task for the client application is greatly simplified—the client application's behavioral view of services requires a low level of specificity. Portability for the client applications in an application system is simplified—for example, a migration to a different target service program could be accomplished by changing only a portion of the gateway executor, and not each and every client application.

TABLE 5

| | |
|---|---|
| withdrawal = appl.getSynchServiceRequest("Withdrawal") | /* fix withdrawal service definition */ |
| . | |
| . | |
| . | |
| withdrawal.setAccount(72359) | /* set account number parm */ |
| withdrawal.setAmount(300.00) | /* set transaction amount parm */ |
| withdrawal.call | /* request service execution */ |
| balance = withdrawal.getBalance | /* get results */ |

Figure 3A:
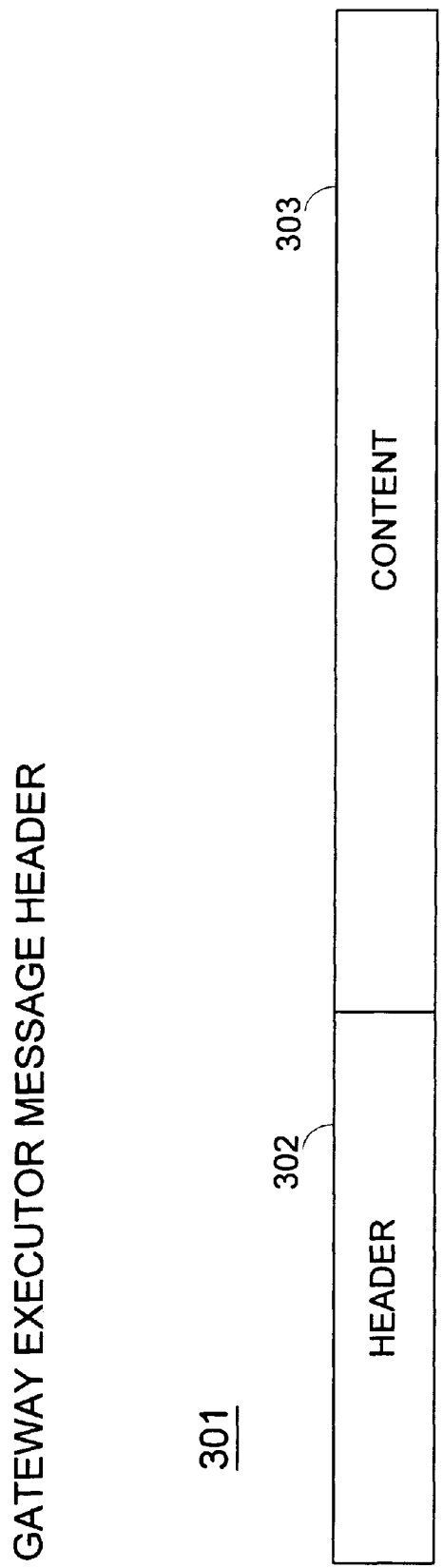
Figure 3D:
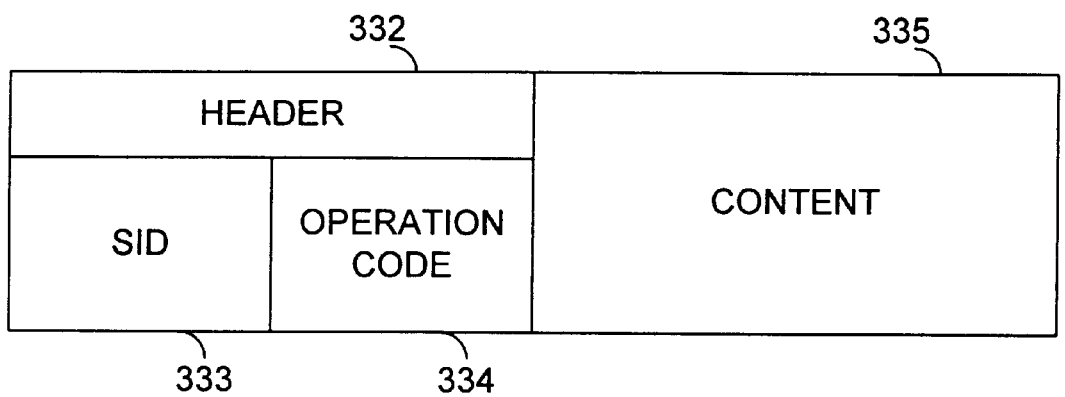

In one embodiment, the API 114 accepts a behavior request in a format compatible with the client application and translates the request into the request service message format of the gateway executor protocol illustrated in FIG. 3(D).

In one embodiment of the gateway executor protocol, a service message 331 contains a service message header area 332 and a service message content area 335. The service message header area 332 further contains an SID area 333 and operation code area 334. In operation, an SID from the gateway executor is placed into the SID area 333. An appropriate operation code selected by the API from a set of predefined choices is placed into the operation code area. FIG. 3(E) depicts one embodiment of a predefined operation code scheme with the operation code values appearing in column 341.

In this embodiment the service message content area 335 contains parameter information. The structure of the parameter information area for any one instance is determined by the operation code 334 in the service message header 332 and whether the service message originates from the API (a request service message) or the gateway executor (a reply service message). FIG. 3(E) depicts one embodiment of parameter information structures defined in terms of an ordered set of named parameters. Column 344 indicates the parameter structure for service messages originating at the client for a corresponding operation code in column 341. Column 345 indicates the parameter structure for service messages originating at the gateway executor for a corresponding operation code in column 341.

Prior to formatting the service request into service message format, or as part of the process, the API may perform certain validation on the behavior request to detect errors locally before transmission to the server processor.

In one possible embodiment, the API validates against information about the service type obtained from the gateway executor repository. The API may use a copy of the repository entry previously obtained from the gateway executor if one is available, or as part of the process of validation may issue a request to the gateway executor to obtain repository information including the needed service type entry. This "caching" technique, applied here to repository entries, is well known in the art and many alternative embodiments would be obvious to one skilled in the art.

When a request service message is properly formatted, the API places it in a service message stack. The construction of stacks is well known in the art and can take many forms. When the stack is complete and ready for transmission to the gateway executor, the API hands it off to the CCM. In the opposite direction, the CCM forwards to the API service message stacks originating from the gateway executor. The API functions to translate the reply service messages in the stack from gateway executor protocol format to client application format, and passes them on to the client application.

THE CCM

Figure 7:
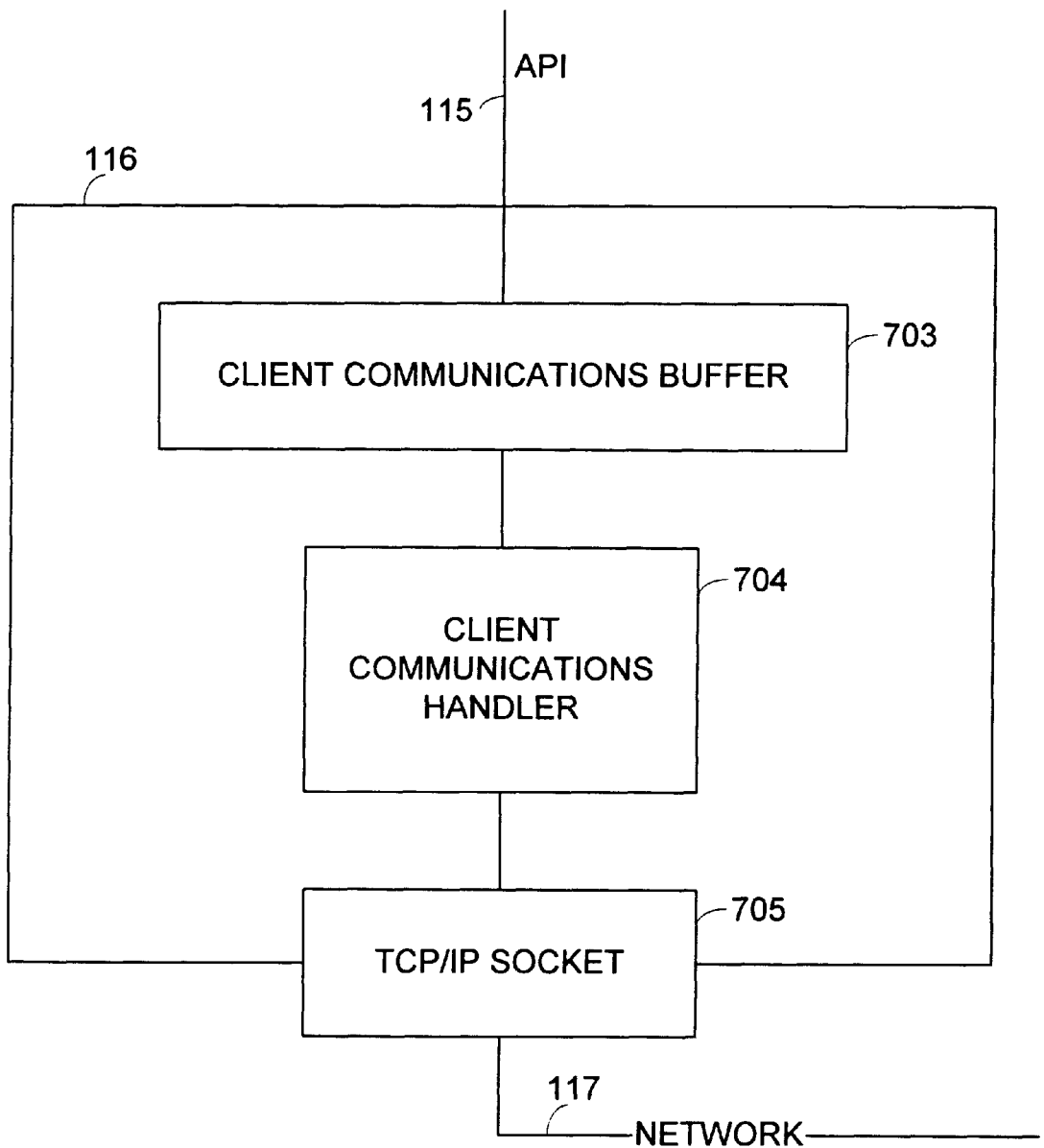
FIG. 7 presents a block diagram of a client communications monitor.

FIG. 7 illustrates the structure of one embodiment of the CCM 116. The client communications buffer 703 is a data area used to hold request and reply service message stacks. The client communications buffer 703 has an inter-component connection 115 with the API. The TCP/IP Socket 705 interfaces the client communication handler to the lower layers of the network 117 using a single TCP/IP port on the client processor. The client communication handler 704 in this embodiment creates the socket 705 when the first communication with the gateway executor is requested.

In one embodiment, when request service message stacks are received from the API, the client communication handler 704 attaches a control header to the front of the stack to form a gateway executor message 301 as depicted in FIG. 3(A). This embodiment of a gateway executor message contains a header area 302 and a content area 303. FIG. 3(B) illustrates the subcomponents of the header.

In this embodiment, the header 311 first contains a version number area 312, the contents of which represent the version level of the software creating the message. The contents of the message code area 313 indicate the source and character of the message. FIG. 3(C) describes one embodiment of message code definitions and column 321 shows the values which may be placed into the message code area 313 during operation.

The message ID area 314 of this embodiment holds a reference identifier optionally generated and used by the client application for its own purposes—the gateway executor ignores the contents of this field other than to copy it to the control headers for related reply messages. The client ID area 315 holds the CID described earlier. The gateway executor ID area 316 holds an identifier representing the gateway executor for which one implementation involves using the operating system's process ID for the gateway executor program process. The message length area 318 holds a number representing the length of the message content portion 303 of the related gateway executor message 301. The reserved area 317 is a placeholder to guarantee the beginning of the content length area 318 at a certain offset from the beginning of the header 311.

In an embodiment employing encryption, the entire gateway executor message may be encrypted at this point. The gateway executor message, ready for transmission, may then be sent across the network using the socket.

The process is reversed for messages received from the network in this embodiment. If encryption is implemented, decryption takes place. The control header is stripped off and the service reply stack is passed to the API.

In summary, the API and CCM may operate as described above to form the client processor side of the bidirectional active channel between a client application and a target service program. In this embodiment, the API, CCM, gateway executor, and the network together form a complete end-to-end channel.

As apparent from the discussion above, the present invention is advantageous because it simplifies client application coding, improves portability, allows legacy TPMs to operate over the Internet, enables deployment of Web-based applications, and increases recoverability and reliability. For example, by utilizing the invention to implement a company's employee timekeeping application, a user could support direct data entry transactions by employees with Internet access, who are dispatched around the globe. In this manner, a user could save the substantial expense of a modem bank on the server and the associated toll call charges.

While the invention has been described with reference to numerous specific details, one of ordinary skill in the art would recognize that the invention can be embodied in other specific forms without departing from the spirit of the invention. For example, the repository entries of the gateway executor could be maintained in an external database by using the services of the target service program, rather than being maintained in storage. Thus, one of ordinary skill in the art would understand that the invention is not to be limited by the foregoing illustrative details, but rather is to be defined by the appended claims.

We claim:

1. An apparatus for connecting a web browser-initiated user application program executing on a network-attached client processor to a target service program (TSP) coupled to a network-attached server processor, comprising:

a gateway executor executing on the server processor and coupled to the TSP, the gateway executor comprising a network connection serving as a first terminus point of a network path, a repository for storing information about one or more services requestable from the TSP, and a message handler coupled to the network connection and the TSP for presenting service requests to the TSP;

a client communication manager (CCM) executing on the client processor for establishing and operating a second terminus point of the network path; and, an application programming interface (API) executing on the client processor responsive to the user application program and coupled to the CCM, the API communicating with the gateway executor via the CCM to retrieve information from the gateway executor repository, and the API responsive to the user application program to communicate with the gateway executor via the CCM to request a service from the TSP.

2. The apparatus of claim 1 wherein the API affects its presentation to the user application program in accordance with retrieved repository information.

3. The apparatus of claim 1 wherein the logical network path between the first terminus point and the second terminus point exclusively conveys communications between the terminus points.

4. The apparatus of claim 1 wherein the gateway executor maintains client context data including a context identifier.

5. The apparatus of claim 4 wherein the context identifier is exchanged bidirectionally between the gateway executor and the CCM.

6. The apparatus of claim 1 wherein the gateway executor generates multiple requests to the TSP in response to a single request from the API.

7. The apparatus of claim 1 wherein the gateway executor stores a first representation of a service request in response to a service request message and a second representation of a service request corresponding to the identical service request message, the second representation conforming to the requirements of the TSP.

8. The apparatus of claim 1 wherein the logical network path between the first terminus point and the second terminus point exclusively conveys communications between the terminus points, and wherein the gateway executor maintains client context data including a context identifier, and wherein the context identifier is exchanged bidirectionally between the gateway executor and the CCM, and wherein the gateway executor generates multiple requests to the TSP in response to a single request from the API, and wherein the gateway executor stores a first representation of a service request in response to a service request message and a second representation of a service request corresponding to the identical service request message, the second representation conforming to the requirements of the TSP.

9. The apparatus of claim 1 wherein the gateway executor maintains client context data including a context identifier, and wherein the gateway executor generates multiple requests to the TSP in response to a single request from the API.

10. The apparatus of claim 9 wherein the context identifier is exchanged bidirectionally between the gateway executor and the CCM.

11. The apparatus of claim 1 wherein the gateway executor generates multiple requests to the TSP in response to a single request from the API, and wherein the gateway executor stores a first representation of a service request in response to a service request message and a second representation of a service request corresponding to the identical service request message, the second representation conforming to the requirements of the TSP.

12. The apparatus of claim 1 wherein the logical network path between the first terminus point and the second terminus point exclusively conveys communications between the terminus points, and wherein the gateway executor maintains client context data including a context identifier.

13. The apparatus of claim 12 wherein the context identifier is exchanged bidirectionally between the gateway executor and the CCM.

14. The apparatus of claim 1 wherein the logical network path between the first terminus point and the second terminus point exclusively conveys communications between the terminus points, and wherein the gateway executor generates multiple requests to the TSP in response to a single request from the API.

15. The apparatus of claim 1 wherein the logical network path between the first terminus point and the second terminus point exclusively conveys communications between the terminus points, and wherein the gateway executor stores a first representation of a service request in response to a service request message and a second representation of a service request corresponding to the identical service request message, the second representation conforming to the requirements of the TSP.

16. The apparatus of claim 1 wherein the logical network path between the first terminus point and the second terminus point exclusively conveys communications between the terminus points, and wherein the gateway executor maintains client context data including a context identifier, and wherein the gateway executor generates multiple requests to the TSP in response to a single request from the API.

17. The apparatus of claim 16 wherein the context identifier is exchanged bidirectionally between the gateway executor and the CCM.

18. The apparatus of claim 1 wherein the logical network path between the first terminus point and the second terminus point exclusively conveys communications between the terminus points, and wherein the gateway executor generates multiple requests to the TSP in response to a single request from the API, and wherein the gateway executor stores a first representation of a service request in response to a service request message and a second representation of a service request corresponding to the identical service request message, the second representation conforming to the requirements of the TSP.

19. The apparatus of claim 2 wherein the logical network path between the first terminus point and the second terminus point exclusively conveys communications between the terminus points.

20. The apparatus of claim 2 wherein the gateway executor maintains client context data including a context identifier.

21. The apparatus of claim 20 wherein the context identifier is exchanged bidirectionally between the gateway executor and the CCM.

22. The apparatus of claim 2 wherein the gateway executor generates multiple requests to the TSP in response to a single request from the API.

23. The apparatus of claim 2 wherein the gateway executor stores a first representation of a service request in response to a service request message and a second representation of a service request corresponding to the identical service request message, the second representation conforming to the requirements of the TSP.

24. The apparatus of claim 2 wherein the logical network path between the first terminus point and the second terminus point exclusively conveys communications between the terminus points, and wherein the gateway executor maintains client context data including a context identifier, and wherein the context identifier is exchanged bidirectionally between the gateway executor and the CCM, and wherein the gateway executor generates multiple requests to the TSP in response to a single request from the API, and wherein the gateway executor stores a first representation of a service request in response to a service request message and a second representation of a service request corresponding to the identical service request message, the second representation conforming to the requirements of the TSP.

25. The apparatus of claim 2 wherein the gateway executor maintains client context data including a context identifier, and wherein the gateway executor generates multiple requests to the TSP in response to a single request from the API.

26. The apparatus of claim 25 wherein the context identifier is exchanged bidirectionally between the gateway executor and the CCM.

27. The apparatus of claim 2 wherein the gateway executor generates multiple requests to the TSP in response to a single request from the API, and wherein the gateway executor stores a first representation of a service request in response to a service request message and a second representation of a service request corresponding to the identical service request message, the second representation conforming to the requirements of the TSP.

28. The apparatus of claim 2 wherein the logical network path between the first terminus point and the second terminus point exclusively conveys communications between the terminus points, and wherein the gateway executor maintains client context data including a context identifier.

29. The apparatus of claim 28 wherein the context identifier is exchanged bidirectionally between the gateway executor and the CCM.

30. The apparatus of claim 2 wherein the logical network path between the first terminus point and the second terminus point exclusively conveys communications between the terminus points, and wherein the gateway executor generates multiple requests to the TSP in response to a single request from the API.

31. The apparatus of claim 2 wherein the logical network path between the first terminus point and the second terminus point exclusively conveys communications between the terminus points, and wherein the gateway executor stores a first representation of a service request in response to a service request message and a second representation of a service request corresponding to the identical service request message, the second representation conforming to the requirements of the TSP.

32. The apparatus of claim 2 wherein the logical network path between the first terminus point and the second terminus point exclusively conveys communications between the terminus points, and wherein the gateway executor maintains client context data including a context identifier, and wherein the gateway executor generates multiple requests to the TSP in response to a single request from the API.

33. The apparatus of claim 32 wherein the context identifier is exchanged bidirectionally between the gateway executor and the CCM.

34. The apparatus of claim 2 wherein the logical network path between the first terminus point and the second terminus point exclusively conveys communications between the terminus points, and wherein the gateway executor generates multiple requests to the TSP in response to a single request from the API, and wherein the gateway executor stores a first representation of a service request in response to a service request message and a second representation of a service request corresponding to the identical service request message, the second representation conforming to the requirements of the TSP.

35. A gateway executor apparatus for receiving and responding to requests from a Web browser-initiated client application program executing on a network-attached client machine, the requests for effecting transactional processing by a target service program (TSP) comprising:

a network connection;

a message handler coupled to the network connection and the TSP for transforming service requests received over the network connection into a format conforming to the requirements of the TSP;

a repository coupled to the message handler for storing information about one or more services requestable from the TSP.

36. The apparatus of claim 20 further comprising a context data store coupled to the message handler for storing information about client application program requests.

37. The apparatus of claim 36 wherein the context data store comprises storage for holding a context identifier corresponding to a particular client application program request.

38. A method for a client-resident application programming interface (API) to adapt itself at run time to present to a Web browser-initiated client application program an interface for requesting service over a network connection from a target service program (TSP) using the intermediate agency of a server-resident gateway executor, comprising:

requesting information from the gateway executor about one or more TSP transactions it can facilitate;

receiving TSP transaction information from the gateway executor;

presenting a behavior to a client application program in accordance with the received TSP transaction information.

39. A method for a client-resident applications programming interface (API) to request service over a network connection from a target service program (TSP) on behalf of a Web browser-initiated client application program, using the intermediate agency of a server-resident gateway executor, comprising:

requesting information from the gateway executor about one or more TSP transactions the gateway executor can facilitate;

receiving TSP transaction information from the gateway executor;

presenting a behavior to a client application program in accordance with the received TSP transaction information;

receiving from the client application program a request to effect the presented behavior;

sending a request to the gateway executor for effecting the TSP transaction associated with the presented behavior.

* * * * *